(12) United States Patent
Archibald et al.

(10) Patent No.: US 7,213,259 B2
(45) Date of Patent: May 1, 2007

(54) METHOD AND APPARATUS FOR A MIXED-MEDIA MESSAGING DELIVERY SYSTEM

(75) Inventors: Edward Archibald, Berkeley, CA (US); Spencer James Brewer, III, Redwood Valley, CA (US)

(73) Assignee: HighWired Technologies, Inc., Redwood City, CA (US)

( * ) Notice: Subject to any disclaimer, the term of this patent is extended or adjusted under 35 U.S.C. 154(b) by 838 days.

(21) Appl. No.: 10/295,760

(22) Filed: Nov. 14, 2002

(65) Prior Publication Data

US 2003/0120726 A1 Jun. 26, 2003

Related U.S. Application Data

(60) Provisional application No. 60/332,470, filed on Nov. 15, 2001.

(51) Int. Cl.
*G06F 15/173* (2006.01)

(52) U.S. Cl. .......................... 726/3; 709/203; 709/206; 379/67.1

(58) Field of Classification Search ............... 726/3; 709/203, 206; 379/67.1
See application file for complete search history.

(56) References Cited

U.S. PATENT DOCUMENTS

| | | | |
|---|---|---|---|
| 5,608,786 A | 3/1997 | Gordon | 379/100 |
| 5,802,314 A | 9/1998 | Tullis et al. | 395/200.76 |
| 5,822,405 A * | 10/1998 | Astarabadi | 379/88.04 |
| 5,974,123 A | 10/1999 | Nakayama et al. | 379/100.16 |
| 6,288,319 B1 * | 9/2001 | Catona | 84/609 |
| 6,459,774 B1 * | 10/2002 | Ball et al. | 379/67.1 |
| 6,549,612 B2 * | 4/2003 | Gifford et al. | 379/67.1 |
| 6,606,647 B2 * | 8/2003 | Shah et al. | 709/206 |
| 6,684,249 B1 * | 1/2004 | Frerichs et al. | 709/225 |
| 6,757,573 B1 * | 6/2004 | Ledoux et al. | 700/94 |
| 2002/0016818 A1 * | 2/2002 | Kirani et al. | 709/203 |
| 2002/0110224 A1 | 8/2002 | Kovales et al. | 379/67.1 |
| 2003/0002643 A1 * | 1/2003 | Seibel et al. | 379/201.02 |

FOREIGN PATENT DOCUMENTS

| | | |
|---|---|---|
| EP | 0 845 894 A2 * | 3/1998 |
| WO | WO01/30046 | 4/2001 |

* cited by examiner

*Primary Examiner*—Taghi T. Arani
(74) *Attorney, Agent, or Firm*—Blakely Sokoloff Taylor & Zafman LLP

(57) ABSTRACT

A method for delivering a mixed media message on a client node coupled to a host node over a network such as the Internet is disclosed. The method comprises choosing a soundscape; recording a message; and mixing the soundscape and the message in a predetermined manner. A host node is disclosed which is configured to provide a client node with the means for performing the method is disclosed. A client node is disclosed which is configured to receive means for performing the method is disclosed.

20 Claims, 13 Drawing Sheets

METHOD AND APPARATUS FOR A MIXED-MEDIA MESSAGING DELIVERY SYSTEM

CROSS REFERENCE TO RELATED APPLICATIONS

This application is a Utility application which claims priority to an earlier filed U.S. Provisional Application No. 60/332,470, filed Nov. 15, 2001.

BACKGROUND OF THE INVENTION

1. Field of the Invention

The present invention relates to data communications. In particular, the present invention relates to delivering a mixed media message.

2. The Prior Art

Background

The widespread acceptance and use of the Internet has generated much excitement, particularly among those who see the Internet as an opportunity to develop new avenues for communication. Many different types of communications are available over the Internet today, including email, IP telephony, teleconferencing and the like.

One application of the Internet that has received attention is adding multimedia capabilities to traditional email services. For example, such a system may provide a downloadable application which allows the user to record a voice message and send it as an email attachment. The email recipient then receives an email with an MP3-encoded audio file attached to it which can then be played with a standard media player. Some systems allow users to utilize a telephone and add a voice message that will be delivered along with the greeting. Still other systems allow the user to include an image, to record audio and to mix an existing audio file with the recorded audio.

While these systems perform their intended functions, they suffer from certain disadvantages. For example, in systems of the prior art, the mix is 'flat', that is, the user's recorded message and the audio file are mixed at 'full volume' for their entire length. Therefore, the resulting mixed audio file will not have a "professional" or polished sound and may result in the user's message being obscured by the background track.

Another disadvantage of prior art systems is that the audio file being used for the background mix will be included in its entirety. Hence, if the background file is 3 minutes long and the voice file is 10 seconds, the entire mix will be three minutes. Again, users will not perceive such a mix as professional and may be additionally frustrated by the time and bandwidth necessary to download unnecessary audio.

BRIEF DESCRIPTION OF THE DRAWING FIGURES

DETAILED DESCRIPTION

Persons of ordinary skill in the art will realize that the following description of the present invention is illustrative only and not in any way limiting. Other embodiments of the invention will readily suggest themselves to such skilled persons having the benefit of this disclosure.

It is contemplated that the present invention may be embodied in various computer and machine-readable data structures. Furthermore, it is contemplated that data structures embodying the present invention will be transmitted across computer and machine-readable media, and through communications systems by use of standard protocols such as those used to enable the Internet and other computer networking standards.

The invention further relates to machine-readable media on which are stored embodiments of the present invention. It is contemplated that any media suitable for storing instructions related to the present invention is within the scope of the present invention. By way of example, such media may take the form of magnetic, optical, or semiconductor media.

The present invention may be described through the use of flowcharts. Often, a single instance of an embodiment of the present invention will be shown. As is appreciated by those of ordinary skill in the art, however, the protocols, processes, and procedures described herein may be repeated continuously or as often as necessary to satisfy the needs described herein. Accordingly, the representation of the present invention through the use of flowcharts should not be used to limit the scope of the present invention.

The present invention may also be described through the use of web pages in which embodiments of the present invention may be viewed and manipulated. It is contemplated that such web pages may be programmed with web page creation programs using languages standard in the art such as HTML or XML. It is also contemplated that the web pages described herein may be viewed and manipulated with web browsers running on operating systems standard in the art, such as the Microsoft Windows® and Macintosh® versions of Internet Explorer® and Netscape®. Furthermore, it is contemplated that the functions performed by the various webpages described herein may be implemented through the use of standard programming languages such a Java® and similar languages.

The present invention will first be described through a diagram that illustrates the structure of the present invention, and then through figures which illustrate the operation of the present invention.

Figure 1:
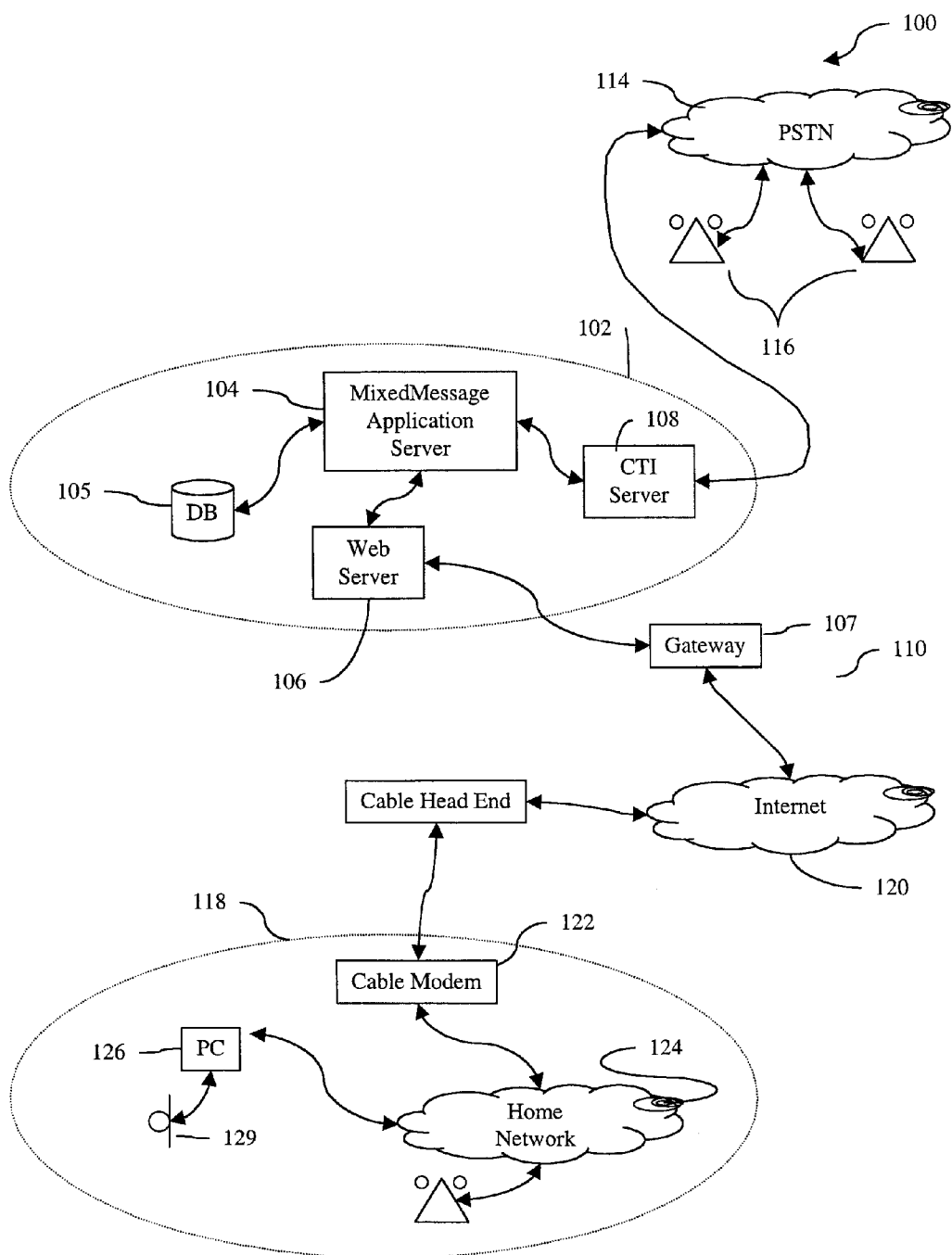
FIG. 1 is a diagram of a mixed-messaging system according to the present invention.

FIG. 1 is a diagram of a mixed-message system 100 according to the present invention. System 100 includes a host system 102 configured to host the present invention. It is contemplated that host 102 may comprise a server configured to run an operating system standard in the art such as Microsoft Windows®, Microsoft Windows® NT, or UNIX®. It is contemplated that host 102 may comprise a single server, or a plurality of servers operatively coupled over a network standard in the art.

Host 102 further includes an application server 104 configured to operate according to the present invention in a manner described in more detail below. Host 102 further includes a database 105 standard in the art for storing programs and media utilized in the present invention.

Host 102 further includes a web server 106 operatively configured to host a website. Web server 106 may comprise hardware and software standard in the art, and preferably is configured to interpret a language useful in Internet applications, such as JAVA®.

To couple the host 102 to the outside world, typically a gateway 108 standard in the art is provided and operatively coupled between web server 106 and backbone network 110. Backbone network 110 may be any packet-based network standard in the art, such as IP, Frame Relay, or ATM.

To provide additional communications to legacy POTS phone, host 102 may include a Computer-Telephony Integration Service (CTI) 108 configured to provide a telephony user interface (TUI) to users.

The system 100 of FIG. 1 also includes an example of a broadband residential client system 118. To reach individual residences, typically local ISP providers provide a cable or DSL head end 120 standard in the art. An individual wishing to utilize the ISP's service may then employ a cable modem or DSL modem 122 coupled to the user's home LAN 124. The user's home LAN may be provided by a home PC 126 configured to run software standard in the art such Microsoft Windows®. The user may then operatively couple an IP telephone 128 to the LAN 124 or directly to computer 126. The user may also operatively couple a microphone 129 directly to computer 126.

The process of delivering a MixedMessage to a voicemail platform consists of five stages. The entire process of MixedMessage delivery is kicked off when a 'package' is put on the work queue for the Messaging. The package could include on or more of the following of the following key information:

Voicemail System Profile ID
Voicemail System access number
Voicemail System PIN for the end-user
Voicemail System Mailbox for the end-user
A MixedMessage in digital audio WAV format
An email address to send message delivery confirmation failure information.

Each of these aspects will be discussed in greater detail below.

Figure 2:
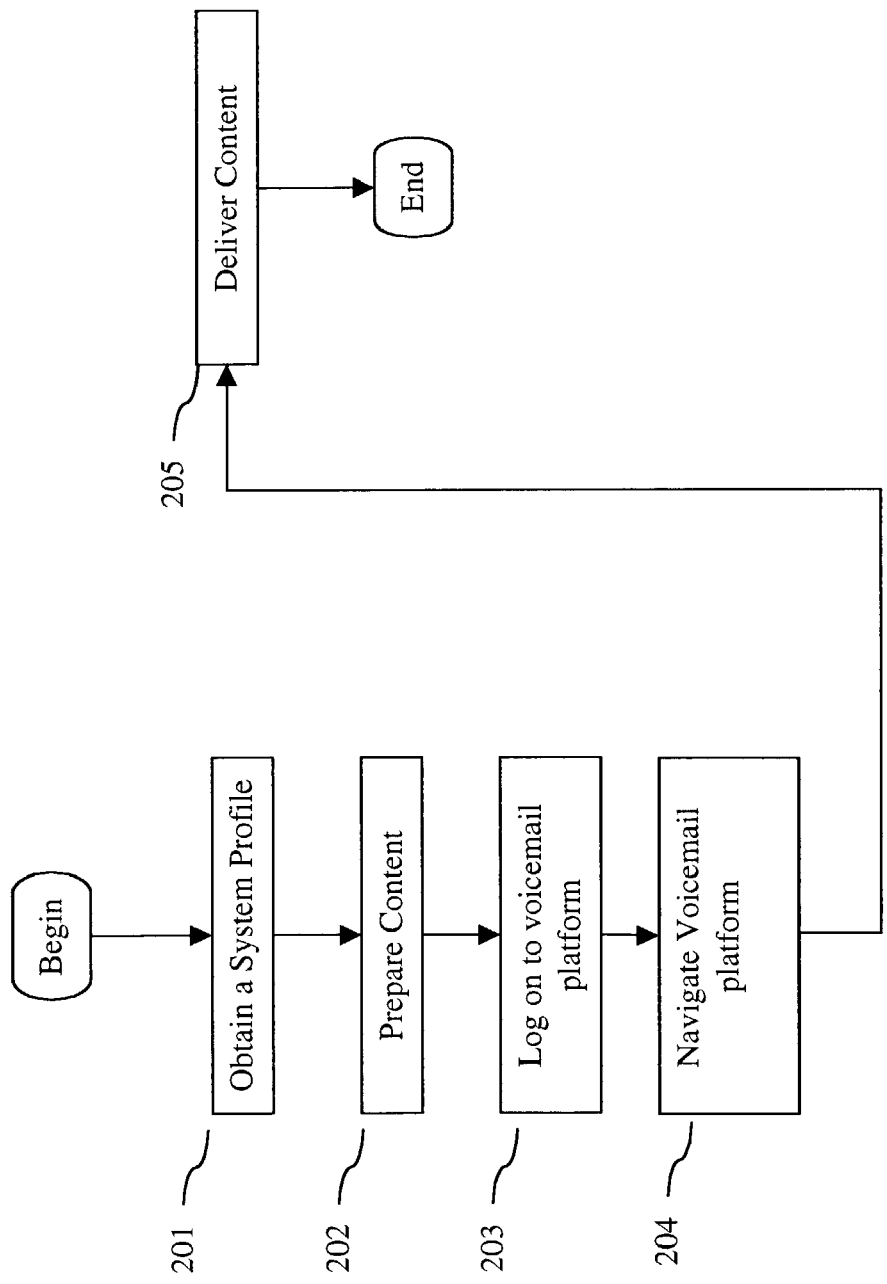
FIG. 2 is a flowchart of a method of delivering a mixed message according to the present invention.

FIG. 2 is a flowchart of a method of delivering a mixed message according to the present invention. FIG. 2 describes the entire delivery of the message, while subsequent figures describe the various aspects of the invention in greater detail. In act 201 the present invention obtains a system profile. In act 202 the present invention prepares the content. In act 203 the present invention logs on to a voicemail platform. In act 204 the present invention navigates the voicemail platform. In act 205 the present invention delivers the content to the voicemail platform.

Figure 3:
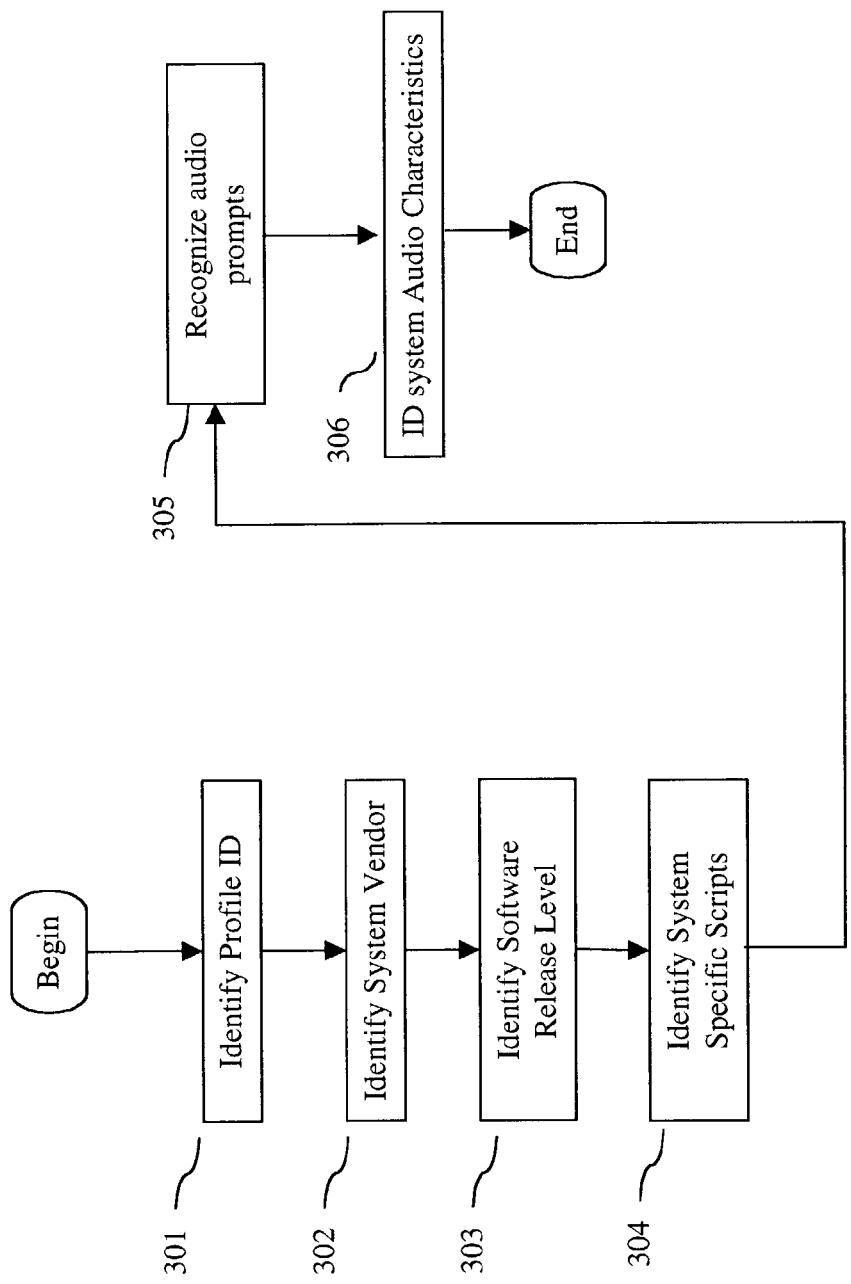
FIG. 3 is a flowchart of a method of obtaining a system profile according to the present invention.

FIG. 3 is a flowchart of a method of obtaining a system profile according to the present invention. In act 301 the present invention identifies the profile ID. A profile ID consists of a set of data that defines key characteristics of a particular system. The profile may be stored in a relational database system, in flat files, in memory, etc. A unique ID identifies the profiles.

In act 302 the system vendor is identified using the key characteristics of the vendor. Non-limiting examples of possible system vendors are Octel, Centigram and Converse.

In act 303 the present invention then identifies the software release level so that the present invention operates the correct parameters.

In act 304 the system identifies the voicemail platform specific script that is to be used. Two scripts to choose from are 1) the script for administering a voicemail greeting and 2) the script for delivering an intentional message.

In act 305 the system recognizes the audio prompts. The messaging gateway needs to be able to recognize a relatively small set of voice prompts that the voicemail system is likely to generate during message delivery processing. An operator using a manual discovery process captures the prompts and these prompts are translated into a form appropriate for a particular speech recognition 'engine.'

In act 306 the present invention identifies the particular audio characteristics of the voicemail system. Each voicemail system has some specific audio characteristics, which must be taken into account when preparing the MixedMessage audio content for use with the voicemail system. For example, the operation of automatic gain control (AGC) stage of some systems makes it necessary to perform some appropriate audio dynamic range compression on the MixedMessage content so that the 'background' part of the MixedMessage remains audible even when the 'voice' part of the MixedMessage contains silence. Another example is where some rolling off of the higher frequency audio content occurs. In this case some audio equalization can be used to boost those frequencies to counteract the rolling off characteristic.

Figure 4:
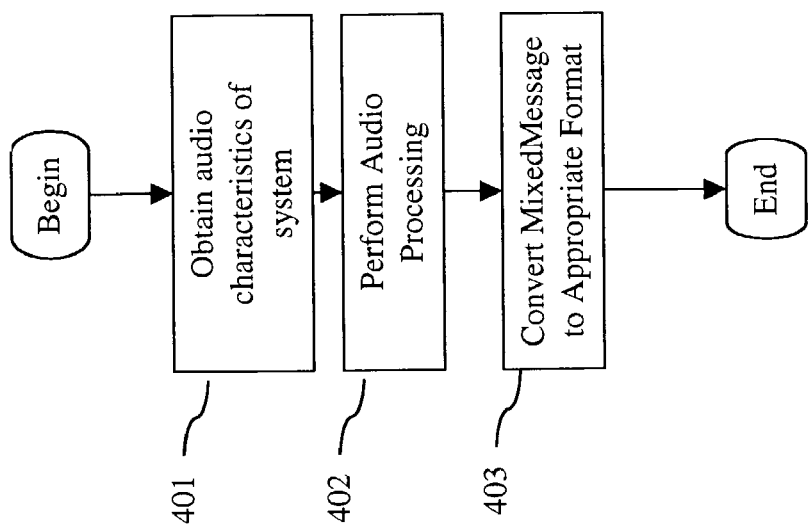
FIG. 4 is a flowchart of a method of preparing the content for a mixed message according to the present invention.

FIG. 4 is a flowchart of a method of preparing the content for a mixed message according to the present invention. There are two stages in preparing the audio content. In the first stage, some DSP-based post-processing is performed on the original WAV format MixedMessage. The second stage converts the file to the appropriate format for delivery. In act 401 the present invention obtains the audio characteristics of the system from the profile obtained above. This profile contains encoded information that describes the type of audio processing that must occur to produce the highest quality voicemail greeting or intentional message.

In act 402 the present invention performs the audio processing on MixedMessage based on the profile. The appropriate audio processing may be performed on the original WAV format MixedMessage and this process will produce a WAV file as output. This step may use techniques such as Equalization and Compression to achieve the appropriate audio processing.

In act 403 the present invention then converts the MixedMessage to the appropriate file format. Depending on the type of CTI hardware being used, the file is converted. For Dialogic-based systems this format is OKI-ADPCM (VOX).

Figure 5:
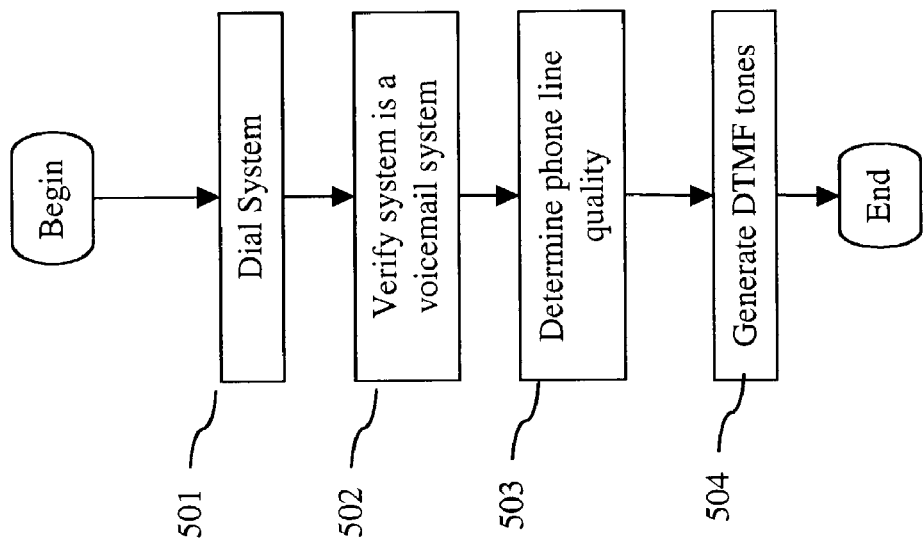
FIG. 5 is a flowchart of a method of logging into a system according to the present invention.

FIG. 5 is a flowchart of a method of logging into a system according to the present invention. In act 501 the present invention uses the system profile and access number to dial the system using PSTN. In act 502 the present invention then verifies that the system is a voicemail system by doing speech recognition when the call is answered. In act 503 the present invention then determines the phone line quality by monitoring speech recognition accuracy. If the quality of the phone line is poor then the present invention will retry the call based on the retry policy of the system profile.

In act 504 the present invention then generates a DTMF tone to communicate the login information. This is done by generating the DTMF tone sequence to communicate the PIN; verifying that the PIN was correct by performing speech recognition on the system response prompt; generating the DTMF tone sequence to communicate the mailbox number; verifying that the mailbox number as correct by performing speech recognition on the system response prompt.

Figure 6:
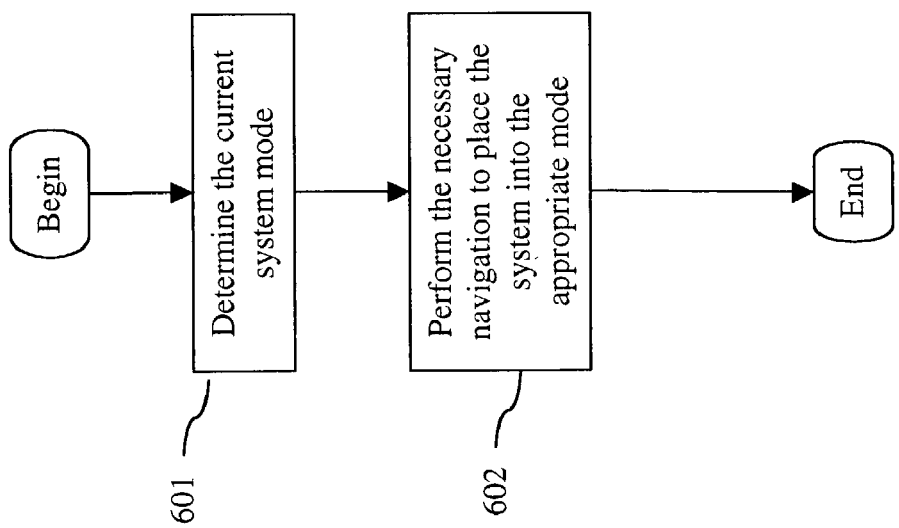
FIG. 6 is a flowchart of navigating the system according to the present invention.

FIG. 6 is a flowchart of navigating the system according to the present invention. In act 601 the present invention determines the current system mode which may be either a voicemail greeting or an intentional message. Then in act 602 the present invention performs the necessary navigation to put the system into the appropriate mode. It does so by checking whether the MixedMessage is a voicemail greeting or an intentional greeting. The present invention generates the DTMF tones and performs the appropriate speech recognition and control flow branching to place the system into the mode t record a voicemail greeting or to record an intentional message.

Figure 7:
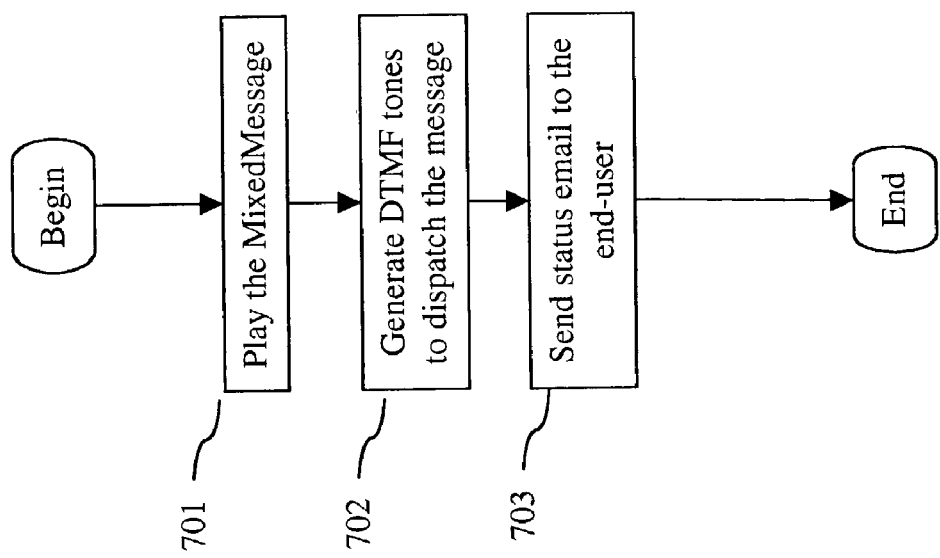
FIG. 7 is a flowchart of a method of delivering the content according to the present invention.

Once the system is in the appropriate 'record' mode it is ready to 'record' the MixedMessage. Then according to the method described in FIG. 7 the content is delivered. In act 701 the present invention plays the MixedMessage to the system using the appropriate CTI hardware facilities. Then in act 702 the present invention generates the DTMF tone sequence to dispatch the message. If the message is a voicemail greeting the present invention confirms the greeting and saves it the voice data is stored in RAM memory in PCM format. If the message is an intentional message the present invention confirms the message and dispatches it. Then in act 703 the present invention may send an email to the end-user with confirmation or error status information.

Figure 8:
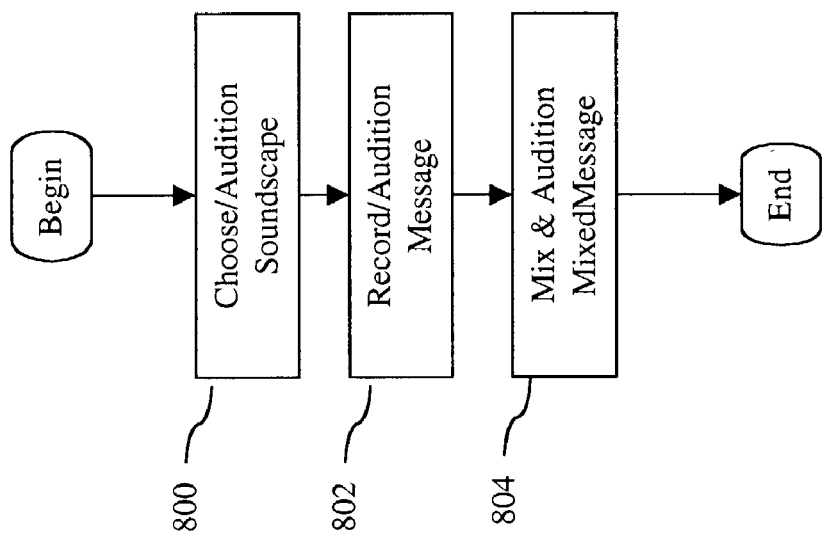
FIG. 8 is a flowchart of a method of creating a mixed message according to the present invention.

The following is a description of the creation of a MixedMessage according to one embodiment. FIG. 8 is a flowchart of the creation of a MixedMessage according to the present invention. In an exemplary non-limiting embodiment of the present invention, the process of FIG. 8 runs on a Windows® platform system including a microphone and speakers. Through the process as shown and described, the present invention creates an audio clip referred to herein as a MixedMessage.

Briefly, the process of FIG. 8 begins in act 800 where a user will select a soundscape. The user then records a message in act 802. Finally, the user mixes the soundscape and their recorded message together into a MixedMessage and previews the MixedMessage in act 804.

Figure 9:
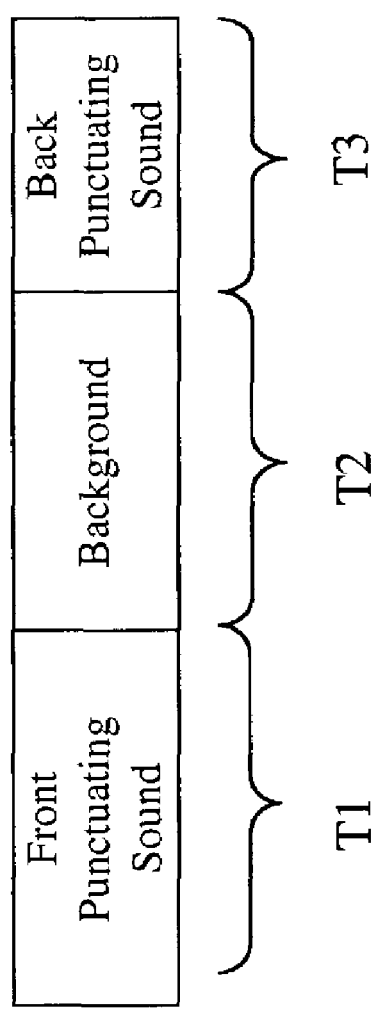
FIG. 9 is a diagram of a soundscape according to the present invention.

Referring now to FIG. 9, a diagram of a soundscape according to the present invention is shown. The soundscape of FIG. 9 is represented as digital audio data composed of audio content occurring during time periods T1, T2, and T3. In an exemplary non-limiting embodiment of the present invention, time period T1 comprises a front punctuating sound (FPS), time period T2 comprises background audio, and time period T3 comprises a back punctuating sound (BPS). In an exemplary non-limiting embodiment of the present invention a soundscape which is comprised of three segments may be composed of three distinct digital audio files. Further, segments that are used to compose a given soundscape may be employed interchangeably in the composition of other soundscapes. Though the present example shows a three-section soundscape, it is contemplated that soundscapes may comprise a wide variety of content and themes.

By way of example, a soundscape having an ocean theme may comprise a FPS consisting of the surf crashing with the sound of seagulls calling in the distance; the background may consist of a continuation of the sound of the surf together with a romantic melody being played on an acoustic guitar; and the BPS consisting of the highlighted cry of a lone seagull.

An example of how a user may utilize the present invention over the Internet will now be shown and described.

The User Interface

Figures 10, 11:
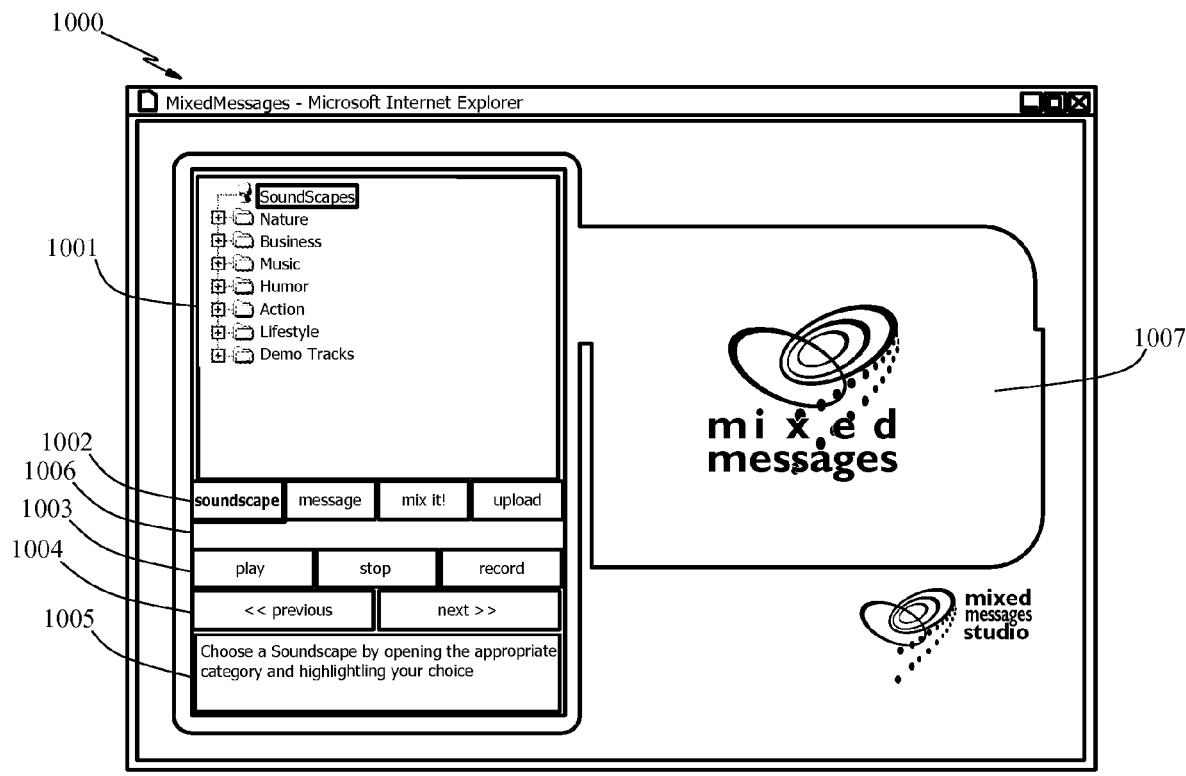
FIG. 10 is a screenshot of the elements of a user interface (UI) according to the present invention.
FIG. 11 is a screenshot of the UI in the soundscape selection phase according to the present invention.

FIG. 10 is a screenshot of a user interface (UI) 1000 according to the present invention. UI 1000 may also include a plurality of components having corresponding functions. In an exemplary non-limiting embodiment of the present invention, these components are used throughout the operation of the invention and may have different functions depending on which 'phase' of the user is in.

The invention UI 1000 includes a soundscape panel 1001. Soundscape panel 1001 is enabled to allow a user to select a soundscape. It is contemplated that soundscape panel 1001 will conform to file selection standards according to the client node's operating system. By way of example, soundscape phase 1001 is shown operating on a Windows®-compatible personal computer.

UI 1000 further includes a phase indicator panel 1002. In an exemplary non-limiting embodiment of the present invention, phase indicator panel 1002 indicates the user's progress in achieving the steps of the present invention as shown and described in FIG. 8.

UI 1000 may also be enabled with media control buttons 1003 which control the operation of playback or recording of the present invention depending on the application phase. UI 1000 may also have navigation buttons 1004 standard in the art which allow the user of the application to move, at appropriate times, between the phases of the application. UI 1000 may also include a context sensitive help/status panel 1005 standard in the art which allows the user to receive help on the operation of the application and on the current operational status of the application. UI 1000 may also include a sound recording/playback progress panel 1006 that indicates the current progress of playback or recording as a 'percentage complete' indicator.

UI 1000 may also include an image display panel 1007 that displays an image corresponding to the selected soundscape.

Choosing a Soundscape

The first step of the present invention is to choose a soundscape.

FIG. 11 is a screenshot of the invention UI in the soundscape selection phase 1100 according to the present invention. It is contemplated that soundscape selection phase 1100 will be displayed to a user on a client node which is operatively coupled to a host node which is configured according to the present invention. In an exemplary non-limiting embodiment of the present invention, the invention UI soundscape selection phase 1100 and the rest of the phases to follow are generated on a client node using hardware and software standard in the art, such as JAVA and a JAVA®-enabled web browser running on a personal computer.

The soundscape selection phase 1100 includes a soundscape panel 1101, a phase indicator panel 1104, media control buttons 1106, navigation buttons 1108, context sensitive help/status panel 1107, and a sound recording/playback progress panel 1103, which function in a manner substantially similar to that of FIG. 10.

The soundscape selection phase 1100 may also include an image display panel 1109 that displays an image corresponding to the selected soundscape.

As can be seen by inspection of FIG. 11, soundscapes according to the present invention are organized into a plurality of Genre folders within the soundscape panel 1101. In an exemplary non-limiting embodiment of the present invention, double-clicking on any of the soundscape Genre folders in the soundscape panel 1101 or clicking on the '+' opens the folder to display a further set of folders at an 'Edition' level.

In an exemplary non-limiting embodiment of the present invention, when a user has opened an 'Edition' level folder, the user will be presented with one or more available soundscapes as indicated by a speaker icon or other suitable indicator. As can be seen by inspection of FIG. 11, the "Monet's Water Garden" soundscape 1102 has been selected. In an exemplary non-limiting embodiment of the present invention, when a user has selected a given soundscape a corresponding image may displayed in the image display panel 1109. In an exemplary non-limiting embodiment of the present invention, the image may be downloaded from the host web server.

Thus, in the example shown in FIG. 11, the user has chosen the "Monet's Water Garden" soundscape 1102 from the "Soothing" Edition of the "Music" Genre.

It is important to note that the various soundscapes may be sorted within soundscape selection panel 1101 by emotional characteristics or other methods. Additionally, soundscapes may be organized by pictures or other indicators such as icons. Additionally, soundscapes and other sources of sounds may be presented by completely different means independent of such a hierarchical representation.

In an exemplary non-limiting embodiment of the present invention, the soundscapes are stored on a media database on the host server and when the user selects a particular soundscape, that soundscape is presented to the client by 'streaming' highly compressed digital audio data to the client to minimize any delay. In an exemplary non-limiting embodiment of the present invention, the soundscape components (i.e. FPS, BG and BPS) are streamed in MP3 format and are converted, on the client, into raw PCM data. In an exemplary non-limiting embodiment of the present invention, the soundscape components will be stored in the RAM of the client node and ultimately played for the user.

A user may select a particular soundscape by single-clicking on it and then can control the playback of the soundscape by using the media control buttons 1106. At any given time, the soundscape that is highlighted in the soundscape panel becomes the soundscape that will be used in other phases of the MixedMessage creation and use.

As can be seen by inspection of FIG. 11, the button labeled 'soundscape' of phase indicator panel 1104 is highlighted to indicate that the user is in the soundscape selection phase.

FIG. 11 as shown and described provides an example of means for selecting a soundscape.

Recording a Message

The next step is for the user to record a message.

Figure 12:
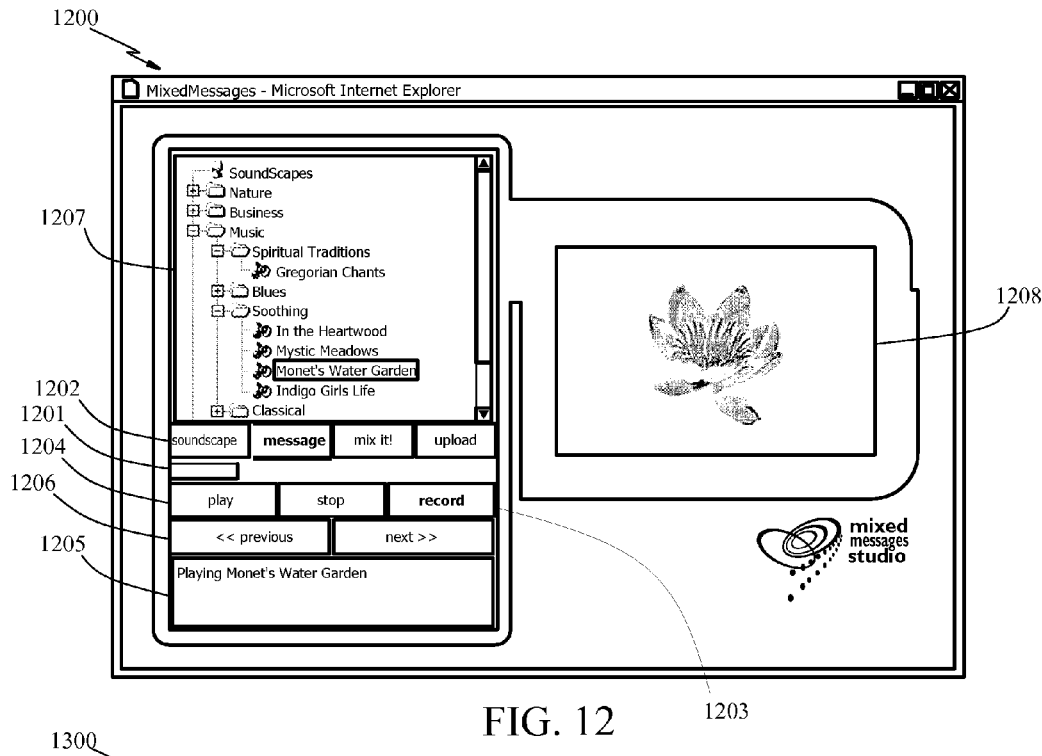
FIG. 12 is a screenshot of the UI in the message recording phase according to the present invention.

FIG. 12 is a screenshot of the UI in the recording phase 1200 according to the present invention. It is contemplated that the recording phase 1200 will be displayed to a user on a client node which is operatively coupled to a host node which is configured according to the present invention.

By way of example, recording phase 1200 is shown operating on a Windows®-compatible personal computer running a JAVA®-enabled web browser.

The recording phase 1200 includes a soundscape panel 1207, a phase indicator panel 1202, media control buttons 1204, navigation buttons 1206, context sensitive help/status panel 1205, and a sound recording/playback progress panel 1201, which all function in a manner substantially similar to that of FIG. 10.

The recording phase 1200 may also include an image display panel 1208 that displays an image corresponding to the selected soundscape.

To start recording, the user may click the 'record' button 1203 in the media control buttons 1204. In an exemplary non-limiting embodiment of the present invention, recording commences immediately and continues until the user presses the 'stop' button in media control button section 1204. The user can then audition the recorded message utilizing he play, pause and stop buttons in media control button section 1204.

In an exemplary non-limiting embodiment of the present invention, the user's voice is recorded using standard hardware and software on the user's computer. In a presently preferred embodiment, the present invention performs necessary media control functions by interfacing with the user's PC using a protocol such a Direct-X®. In an exemplary non-limiting embodiment of the present invention, the voice data is stored in RAM memory in PCM format. For permanent storage, the voice data may be stored as a .wave file on the client node.

In an exemplary non-limiting embodiment of the present invention, the user may indicate that they are satisfied with their message and are ready to move on to the next step by pressing the control button 1206 or the appropriate application phase indicator button 1202.

As can be seen by inspection of FIG. 12, the button labeled 'message' of phase indicator panel 1202 is highlighted to indicate that the user is in the record phase.

Additionally, the bar in sound recording/playback progress panel 1201 has lengthened to indicate the user's further progress through the present invention.

The recording phase 1200 as shown and described provides an example of means for recording a message.

Mixing

The next step is to mix the chosen soundscape with the recorded message.

Figure 13:
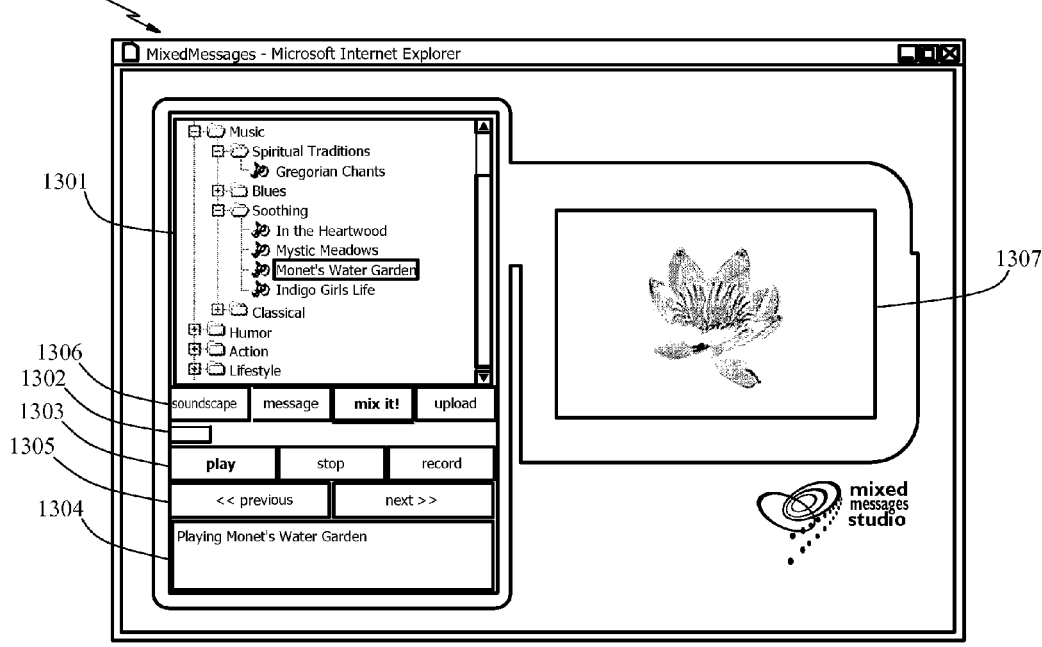
FIG. 13 is a screenshot of the UI in the mix preview phase according to the present invention.

FIG. 13 is a screenshot of the invention UI in the mix review phase 1300 according to the present invention. It is contemplated that mix review phase 1300 will be displayed to a user on a client node which is operatively coupled to a host node which is configured according to the present invention.

By way of example, mix review phase 1300 is shown operating on a Windows®-compatible personal computer running a JAVA®-enabled web browser.

The mix review phase 1300 includes a soundscape panel 1301, a phase indicator panel 1306, media control buttons 1303, navigation buttons 1305, context sensitive help/status panel 1304, and a sound recording/playback progress panel 1302, which function in a manner substantially similar to that of FIG. 11.

The mix review phase 1300 may also include an image display panel 1307 that displays an image corresponding to the selected soundscape.

In an exemplary non-limiting embodiment of the present invention, the user initiates the mixing process by clicking on the 'play' button in media control buttons 1303. The present invention then mixes the recorded message and the chosen soundscape in a predetermined manner. In an exemplary non-limiting embodiment of the present invention, the soundscape is streamed from the server, decoded, and stored in the client's RAM; the recorded message is then read from the client node's RAM; and all of the aforementioned components are then mixed in a predetermined manner and immediately played for the end user as audio. The progress of the mixing process may be displayed to the user through progress indicator 1302.

In preferred embodiments, the actual mix takes place in real time and the end user hears the result immediately. By performing the mixing process on the client node, the present invention allows the mixing process to occur in real time. This immediacy of the end-user feedback is a significant improvement over systems of the prior art and provides users with increased convenience. For example, in systems utilizing the present invention, users may then choose different soundscapes with their recorded message, and hear the preview immediately.

In an exemplary non-limiting embodiment of the present invention, the recorded voice message is processed using audio processing tools standard in the art prior to the mixing process.

As can be seen by inspection of FIG. 13, the button labeled 'mix it!' of phase indicator panel 1306 is highlighted to indicate that the user is in the mix and review phase.

The mixing phase 1300 as shown and described provides an example of means for mixing and reviewing a message.

Figure 14:
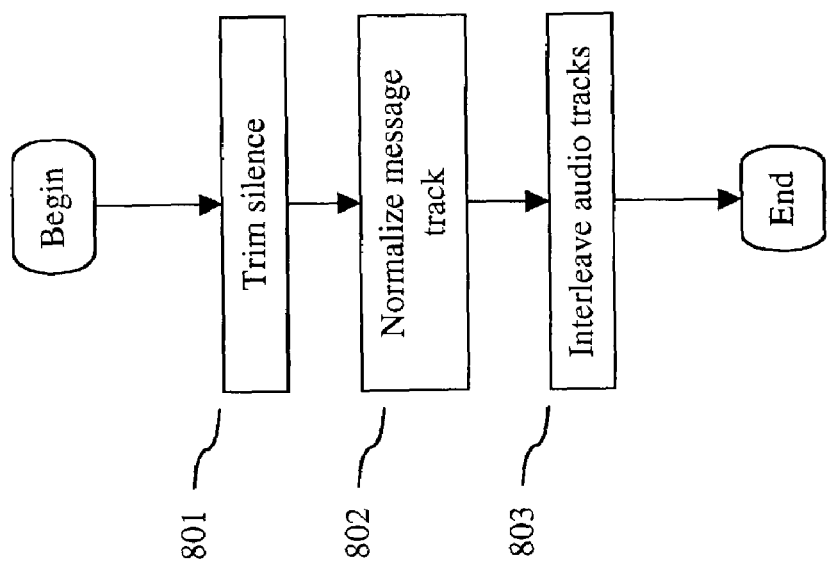
FIG. 14 is a flowchart of mixing according to the present invention.

FIG. 14 is a flowchart of a method for mixing a soundscape and a recorded message according to the present invention. The process of FIG. 14 may be performed by media tools standard in the art running on the client node. In an exemplary non-limiting embodiment of the present invention, the length of the recorded message may also be determined for use with other aspects of the present invention.

The process of FIG. 14 begins with the present invention examining the recorded message and removing any silence from the beginning and end of the recorded message in act 800. In an exemplary non-limiting embodiment of the present invention, act 800 is performed using audio gating tools standard in the art.

The process of FIG. 14 continues with the recorded message being normalized in act 1402. As is appreciated by those of ordinary skill in the art, the process of normalization involves the use of compression and limiting tools which adjust the peak and average levels of an audio signal in a predetermined manner, thus giving an audio signal a "studio" quality. In an exemplary non-limiting embodiment of the present invention, act 1402 may be performed using compression/limiter tools standard in the art. Tim: We intend to do more processing than is indicated here.

The process of FIG. 14 concludes with act 1404, where the present invention interleaves the gated and normalized recorded message with the chosen soundscape in a predetermined manner.

It is contemplated that other acts may be performed during the mixing process in addition to those listed in FIG. 14. For example, additional process steps such as trimming or harmonizing may be performed on the recorded message; the length of the voice track may be calculated; the mix contours for all tracks may be calculated, such as the starting offset, volume changes, ramp up and ramp down time, and ending offset as will be further described below. Additionally, the present invention may initiate streaming of the user's recorded message back to the host server, or output the result of the mix to a digital audio file on the client node.

Figure 15:
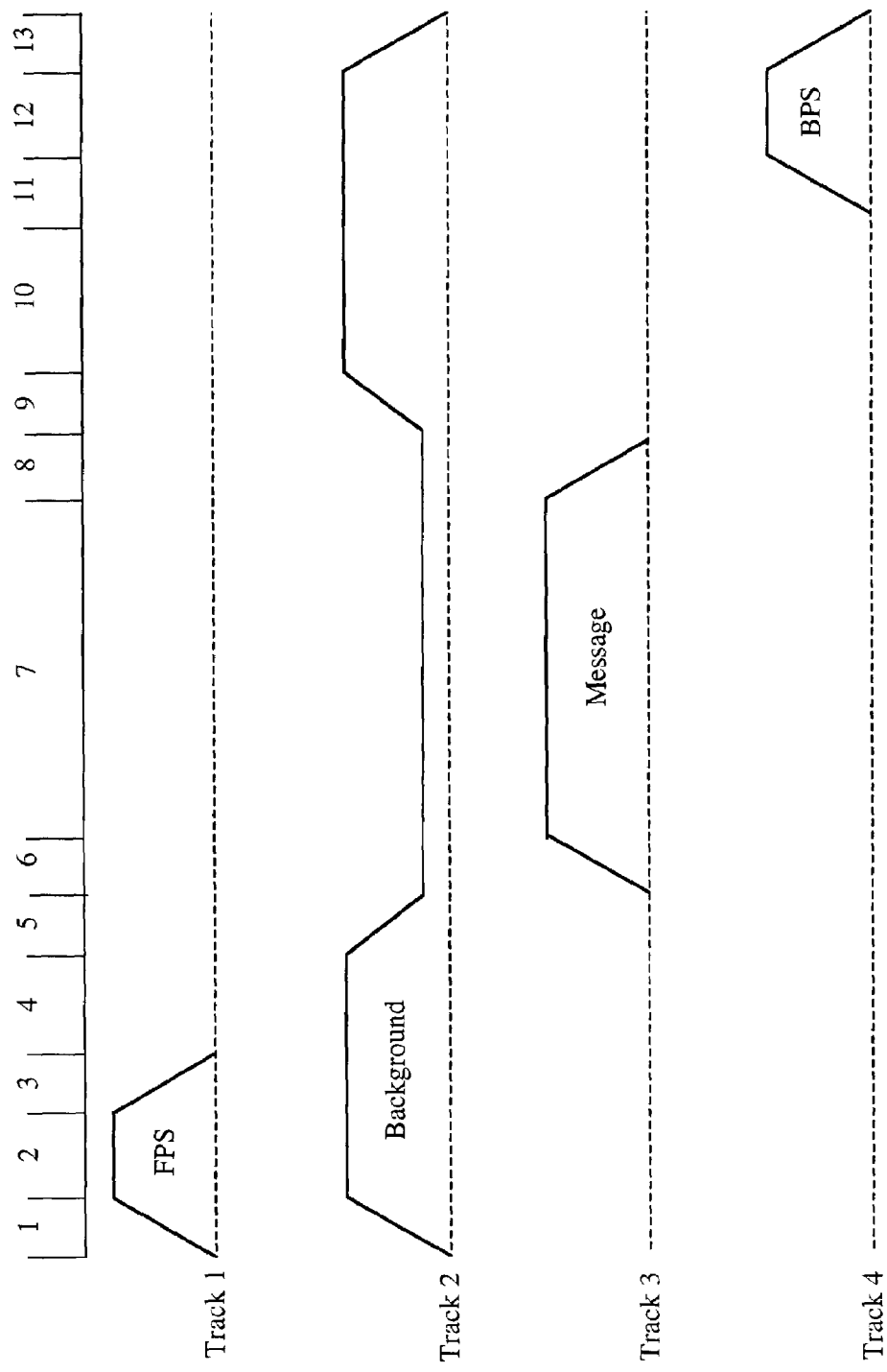
FIG. 15 is a diagram of a mixing template according to the present invention.

FIG. 15 is a diagram of an interleaving process according to the present invention. FIG. 15 demonstrates how the various audio tracks which comprise a MixedMessage are assembled into a final product. FIG. 15 shows each individual track with its corresponding level contour all displayed along a common time axis, with particular time intervals of interest numerically indicated along a top time axis.

FIG. 15 shows one aspect of the present invention where a front punctuating sound, a background, a recorded message, and a back punctuating sound are interleaved together to form a MixedMessage. As can be seen by inspection of FIG. 15, each individual track has a corresponding contour, where each contour has a corresponding level and time offset. The overall effect of the tracks and their corresponding contours may be said to form a MixedMessage template.

It is contemplated that a MixedMessage template may comprise any number of individual tracks. It is further contemplated that each individual track may consist of any multimedia information suitable for display or presentation to a user. Though the present example consists of audio information be interleaved, it is contemplated that each audio track may consist of a sub-mix of audio information mixed in a previous mixing process. It is further contemplated that other media, such a video information, may be included in the process of the present invention.

Referring back to FIG. 15, and more specifically to track 1, the front punctuating sound (FPS) is first mixed in. In an exemplary non-limiting embodiment of the present invention, the FPS is mixed in by bringing the FPS into the mix by raising its level at a predetermined rise time during time interval 1. The level of the FPS is then held for a predetermined length of time during time interval 2, then the FPS is removed from the mix by dropping its level at a predetermined fall time during time interval 3. In a presently preferred embodiment, time interval 1 lasts approximately 0.1 seconds, time interval 2 lasts approximately 1 to 3 seconds, and time interval 3 lasts approximately 0.1 seconds.

Referring now to track 2, the background is mixed in a manner similar to the FPS during time intervals 1–4. However, during time interval 5, the background level is lowered to a predetermined level at time interval 5. In a presently preferred embodiment, the background is lowered to a non-zero level until time interval 8, referred to as the bed volume. In an exemplary non-limiting embodiment of the present invention, the bed volume is approximately 10–18 dB below the level of the recorded message. Referring now to track 3, the recorded message is mixed in during time interval 6 by raising the level of the message at a predetermined rise time. The message is then played for its predetermined length during time interval 7. The message is then removed from the mix by lowering its level at a predetermined fall time during time interval 8.

After the message has concluded in time interval 8, the background level is then raised at a predetermined rise time during time interval 9, and then may be played for a predetermined amount of time during time interval 10.

Referring now to track 4, the back punctuating sound (BPS) may be brought into the mix by raising its level at a predetermined rise time during time interval 11. The BPS level may then be maintained for a predetermined amount of time during time interval 12. Finally, to conclude the Mixed- Message, both the BPS and the background may be mixed down by lowering their levels at a predetermined fall time during time interval 13.

As can be seen by inspection of FIG. 15, the template according to the present invention may be characterized as mixing predetermined information around a message provided by a user.

FIGS. 13, 14 and 15 as shown and described provide examples of means for mixing a soundscape and a recorded message into a MixedMessage.

After the processes described above are complete, additional acts may be performed. For example, when the user is satisfied with the result, an upload phase may generate an XML document which describes in detail all of the elements of the MixedMessage, including for example, the contours as shown and described in FIG. 10. This XML document is then sent to the MixedMessages Application Server and represents instructions by which the host node may reproduce the exact mix chosen by the user on the client node. The MixedMessage may then be stored as a .wave file in the database on the host. It is contemplated that the actual mix process, the storage of the file, additional audio processing during the mix, output file conversion to different formats may take place on the host node.

The finished MixedMessage produced according to the present invention may then be used in a variety of manners. For example, in an exemplary non-limiting embodiment of the present invention, the MixedMessage can be uploaded to a voice mail system chosen by the user for use as a voice mail greeting. The MixedMessage may also be used to create an "intentional message" to be sent to a recipient's voice mailbox. In yet another aspect of the present invention, the MixedMessage may be utilized to create an email message which includes the MixedMessage along with associated text and the chosen image.

It further contemplated that during the recording and creation of the MixedMessage, additional processes may take place, also. For example, it is contemplated that the user may manually modify the contours of the interleaving process. This modification may be accomplished by presenting the user with controls presented during the mixing phase which may be used to adjust the level and time contours, for example.

Furthermore, it is contemplated that the user may also modify the recorded message with processing tools to enhance or modify the voice information. For example, the user may be able to make their voice sound similar to that of a popular character or celebrity. It is contemplated that this procedure may be accomplished by presenting the user with audio processing tools during the recording or mixing/audition phases.

While embodiments and applications of this invention have been shown and described, it would be apparent to those skilled in the art that many more modifications than mentioned above are possible without departing from the inventive concepts herein. The invention, therefore, is not to be restricted except in the spirit of the appended claims.

What is claimed is:

1. A method for delivering an audio MixedMessage from a server to a recipient system comprising:
   obtaining, by the server a system profile for said recipient system of said MixedMessage;
   performing DSP-based post-processing on said MixedMessage by said server in accordance with audio characteristics determined from said system profile;
   preparing, by said server in accordance with said system profile, said MixedMessage in an appropriate format for delivery to said recipient system; and
   delivering said MixedMessage to said recipient system.

2. The method of claim 1 wherein said act of delivering said content further includes:
   logging on to said recipient system, by said server using said system profile; and
   navigating said recipient system, by said server to put said recipient system in a mode for recording a voicemail greeting.

3. The method of claim 2 wherein said act of logging on to said recipient system further includes:
   using said system profile to dial said recipient system;
   verifying that the recipient system is a voicemail system using voice recognition; and
   generating DTMF tones to communicate with said recipient system.

4. The method of claim 3 wherein said generating DTMF tones further includes:
   generating the DTMF tone sequence to communicate a PiN;
   verifying that said PIN was correct by performing speech recognition on a system response prompt;
   generating the DTMF tone sequence to communicate a mailbox number;
   verifying that the mailbox number is correct by performing speech recognition on said system response prompt.

5. The method of claim 1 wherein said act of delivering said content further includes:
   playing a message to said recipient system; and
   generating a DTMF tone sequence to dispatch said message.

6. The method of claim 1 further comprising sending a status email that includes a confirmation that the MixedMessage was received by said recipient system.

7. The method of claim 1 wherein said act of obtaining a system profile further includes:
   logging on to said recipient system using said system profile; and
   navigating said recipient system to put said recipient system in the appropriate mode for sending an intentional message.

8. An apparatus for delivering an audio MixedMessage from a server to a recipient system comprising:
   a server having a processor and memory configured to obtain a system profile from said memory for said recipient system of said MixedMessage, perform DSP-based post-processing on said MixedMessage by said server in accordance with audio characteristics determined from said system profile, prepare in accordance with said system profile said MixedMessage in an appropriate format for delivery to said recipient system and deliver said MixedMessage to said recipient system.

9. The apparatus of claim 8 wherein said server is further configured to log on to said recipient system using said system profile and navigate said recipient system to put said recipient system in said appropriate format for recording a voicemail greeting.

10. The apparatus of claim 9 wherein said server is further configured to use said system profile to dial said recipient system verify that the recipient system is a voicemail system using voice recognition and generate DTMF tones to communicate with said recipient system.

11. The apparatus of claim 8 wherein said server is further configured to generate the DTMF tone sequence to communicate a PIN, verify that said PIN was correct by performing speech recognition on a system response prompt, generate the DTMF tone sequence to communicate a mailbox number, and verify that the mailbox number is correct by performing speech recognition on said system response prompt.

12. The apparatus of claim 8 wherein said server is further configured to play a message to said recipient system and generate a DTMF tone sequence to dispatch said message.

13. The apparatus of claim 8 wherein said server is further configured to send a status email that includes a confirmation that the MixedMessage was received.

14. The apparatus of claim 8 wherein said server is further configured to log on to said recipient system using said system profile and navigate said recipient system to put said recipient system in the appropriate mode for sending an intentional message.

15. An apparatus for delivering an audio MixedMessage from a server to a recipient system comprising:
- means for obtaining a system profile for said recipient system of said MixedMessage;
- means for performing DSP-based post-processing on said MixedMessage by said server in accordance with audio characteristics determined from said system profile;
- means for preparing in accordance with said system profile said MixedMessage in an appropriate format for delivery to said recipient system; and
- means for delivering said MixedMessage to said recipient system.

16. The apparatus of claim 15 further including:
- means for logging on to said recipient system using said system profile; and
- means for navigating said recipient system to put said recipient system in said appropriate format for recording a voicemail greeting.

17. The apparatus of claim 16 further including:
- means for using said system profile to dial said recipient system;
- means for verifying that the recipient system is a voicemail system using voice recognition; and
- means for generating DTMF tones to communicate with said recipient system.

18. The apparatus of claim 15 further including:
- means for generating the DTMF tone sequence to communicate a PIN;
- means for verifying that said PIN was correct by performing speech recognition on a system response prompt;
- means for generating the DTMF tone sequence to communicate a mailbox number; and
- means for verifying that the mailbox number is correct by performing speech recognition on said system response prompt.

19. The apparatus of claim 15 further including:
- means for playing a message to said recipient system; and
- means for generating a DTMF tone sequence to dispatch said message.

20. The apparatus of claim 15 further including:
- means for logging on to said recipient system using said system profile; and
- means for navigating said recipient system to put said recipient system in the appropriate mode for sending an intentional message.

* * * * *